No. 825,297. PATENTED JULY 10, 1906.
R. BRUNCK.
PROCESS OF EXTRACTING AMMONIA FROM GASES.
APPLICATION FILED AUG. 21, 1905.
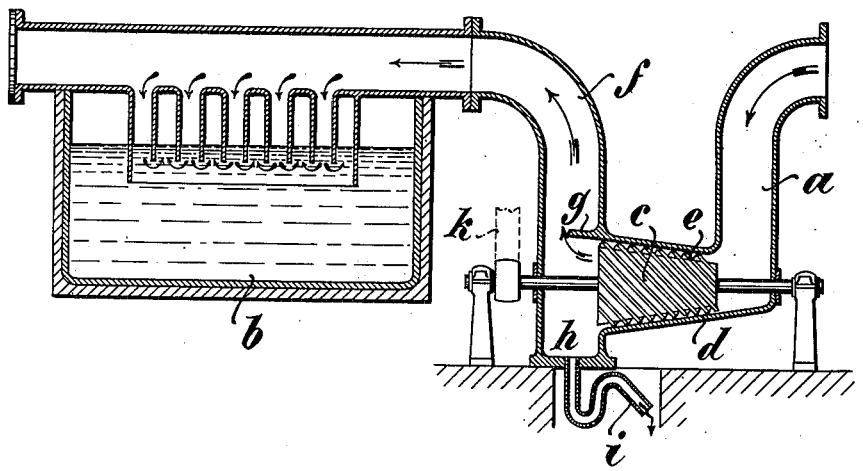
WITNESSES
W. P. Burke
A. J. Callaghan
INVENTOR
Rudolph Brunck
By Richardson
ATTY'S.

UNITED STATES PATENT OFFICE.

RUDOLPH BRUNCK, OF DORTMUND, GERMANY.

PROCESS OF EXTRACTING AMMONIA FROM GASES.

No. 825,297.     Specification of Letters Patent.     Patented July 10, 1906.

Application filed August 21, 1905. Serial No. 275,087.

*To all whom it may concern:*

Be it known that I, RUDOLPH BRUNCK, a subject of the King of Bavaria, residing at Dortmund, Germany, (whose post-office address is No. 14 Prinz Friedrich Carl strasse, Dortmund, Prussia, German Empire, have invented a new and useful Process of Extracting Ammonia from Distillation - Gases, of which the following is a specification.

This invention relates to the extraction of ammonia from the hot gases produced by dry distillation of coal, wood, peat, and other substances, the hot gases being washed with concentrated acid. It has for its object to improve this process, so that the acid is completely and solely used for the absorption of ammonia and that, moreover, the ammonia salt can be purified quicker and in a more simple fashion. With the said process as hitherto practiced the hot gases are caused to meet the concentrated acid prior to being deprived of their contents of tar. The consequence of this is that part of the acid is consumed in combining with basic constituents of the tar, such as pyridin bases, &c., while another part of the acid mixes with the condensed tar and is carried away by it. Moreover, the presence of tar in the acid or ammonia salt solution has the bad effect of soiling the ammonia-salt, whereby its purification requires more work and time. In order to avoid these inconveniences, the present invention consists in treating the hot gases before meeting the acid, so that the tar is removed as thoroughly as possible without wasting any ammonia. This is obtained by subjecting the hot gases on their passage from the coking-chambers, retorts, or other distilling vessels to the absorbing apparatus to centrifugal action at such a temperature as will prevent the water vapors in the gas from being condensed in order that no absorption of ammonia by water can take place, but all is retained in the gas. Any known construction of centrifugal apparatus adapted for the treatment of gases may be employed. By proceeding in this manner it is possible without any loss of ammonia to remove the tar from the hot gases to such an extent that only a very small proportion of it is left in the gas to be condensed in the acid. Moreover, the remaining tar is separated in such a liquid state that it easily flows off from the surface of the acid in the washer.

The advantages resulting from the described improvement are as follows: First, there is no acid used for other reactions but the production of ammonia salts; second, the quality and value of the tar are greatly increased by the valuable pyridin and other bases being retained in the tar; third, the washing required for depriving the tar from adhering acid is limited to the small proportion condensed in the washer; fourth, the ammonia salt is directly obtained almost free from tar, whereby its washing can be performed in a very thorough manner within a short time, resulting in a much purer salt than heretofore.

On the annexed sheet one form of execution of the new invention is shown in longitudinal section, the coking-chamber, retort, or other distilling or generating apparatus being omitted.

$a$ is the conduit through which the gas arrives from the distilling apparatus, and $b$ the washer, which is of known construction and supplied with concentrated acid—for instance, sulfuric acid. As shown, the gas-conduit $a$ opens into a centrifugal apparatus of known construction composed of a conical drum $c$, rotating within a conical casing $d$, which communicates with the said gas-conduit by its narrower end. The drum $c$ is provided on its surface with spiral ribs or beaters $e$, which extend to a short distance from the inner side of the casing $d$. The latter opens with its wider end into the gas-conduit $f$, communicating between the centrifugal apparatus and the washer. Preferably a deflecting-plate $g$ is disposed within the conduit $f$ above the mouth of the casing $d$. The conduit $f$ is extended downward in order to form a tar-collecting chamber $h$, provided with a siphon-like outflow $i$. The centrifugal apparatus is driven by means of a pulley and belt $k$.

The hot gases supplied to the centrifugal apparatus by the conduit $a$ pass between the casing and the drum by being dissipated in as many spiral currents as there are ribs $e$. The drum being rotated with a rapid speed, the gas-currents are subjected to centrifugal action, with the effect that the vaporous tar in the gases is progressively condensed and finally ejected into the chamber $h$, from whence it flows off through the siphon $i$, the hot gases passing up through the conduit $f$ into the washer $b$. During its passage through the centrifugal apparatus the gas is kept at such a temperature as will prevent the water vapors in the gas from being condensed, so that no loss of ammonia can occur.

It is to be understood that the present invention shall not be limited to its use with the type of closed washers shown in the figure, but that it is intended to be also used with closed washers of other construction, as scrubbers and the like. Moreover, other kinds of gas centrifugal apparatus may be used; and the tar may be collected and passed in any other suitable manner.

What I claim, and desire to secure by Letters Patent of the United States, is—

The improved process of extracting ammonia from the gases evolved during the dry distillation of coal, wood, peat and other substances which consists in first centrifuging the hot gases at a temperature above the boiling-point of water for removing the tar without condensation of water vapors, and then washing the gases with concentrated acid, substantially as described.

In testimony whereof I have hereunto set my hand in presence of two subscribing witnesses.

RUDOLPH BRUNCK.

Witnesses:
  WILLIAM ESSENWEIN,
  PETER LIEBER.